United States Patent
Srivastav et al.

(10) Patent No.: US 9,947,232 B2
(45) Date of Patent: Apr. 17, 2018

(54) METHODS AND APPARATUS FOR IDENTIFYING TERRAIN SUITABLE FOR AIRCRAFT LANDING

(71) Applicant: HONEYWELL INTERNATIONAL INC., Morris Plains, NJ (US)

(72) Inventors: Amit Srivastav, Karnataka (IN); Travis Pike, Seattle, WA (US); Sajeev Achuthan Divakaran, Kerala (IN); Sreedhar Garbham, Telengana (IN); Krishna Idupunur, Telengana (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 20 days.

(21) Appl. No.: 14/962,438

(22) Filed: Dec. 8, 2015

(65) Prior Publication Data
US 2017/0162061 A1    Jun. 8, 2017

(51) Int. Cl.
| | | |
|---|---|---|
| G08G 5/00 | (2006.01) | |
| G06F 3/0481 | (2013.01) | |
| B64D 43/00 | (2006.01) | |
| G08G 5/02 | (2006.01) | |
| G05D 1/06 | (2006.01) | |
| B64G 1/00 | (2006.01) | |
| G01S 13/94 | (2006.01) | |

(Continued)

(52) U.S. Cl.
CPC .......... *G08G 5/0056* (2013.01); *B64D 43/00* (2013.01); *G06F 3/0481* (2013.01); *G08G 5/0013* (2013.01); *G08G 5/0021* (2013.01); *G08G 5/0026* (2013.01); *G08G 5/0086* (2013.01); *G08G 5/025* (2013.01); *B64G 1/00* (2013.01); *G01S 13/89* (2013.01); *G01S 13/94* (2013.01); *G01S 17/89* (2013.01); *G01S 17/933* (2013.01); *G05D 1/0676* (2013.01)

(58) Field of Classification Search
None
See application file for complete search history.

(56) References Cited

U.S. PATENT DOCUMENTS

| | | | |
|---|---|---|---|
| 7,363,157 B1 * | 4/2008 | Hanna | G01C 11/00 702/5 |
| 7,689,328 B2 * | 3/2010 | Spinelli | G01C 21/20 340/945 |

(Continued)

FOREIGN PATENT DOCUMENTS

| | | |
|---|---|---|
| CN | 103869820 A1 | 6/2014 |
| EP | 2884305 A1 | 6/2015 |
| WO | 2008061307 A1 | 5/2008 |

OTHER PUBLICATIONS

Scherer, S. et al.; Online Assessment of Landing Sites; AIAA Infotech@Aerospace Apr. 20-22, 2010, Altanta, Georgia.

(Continued)

*Primary Examiner* — Redhwan K Mawari
*Assistant Examiner* — Edward Torchinsky
(74) *Attorney, Agent, or Firm* — Lorenz & Kopf, LLP (57) ABSTRACT

A method for providing landing assistance for an aircraft is provided. The method analyzes terrain data; identifies one or more landing zones, based on analyzing the terrain data, each of the one or more landing zones comprising a flat area lacking obstacles to aircraft landing; and presents the one or more landing zones via a display element onboard the aircraft.

16 Claims, 6 Drawing Sheets

(51) Int. Cl.
  *G01S 17/89* (2006.01)
  *G01S 17/93* (2006.01)
  *G01S 13/89* (2006.01)

(56) References Cited

U.S. PATENT DOCUMENTS

| | | | |
|---|---|---|---|
| 8,485,029 B2* | 7/2013 | Anders | G01C 23/005 |
| | | | 345/8 |
| 8,521,343 B2 | 8/2013 | Spinelli | |
| 8,600,589 B2* | 12/2013 | Mendez-Rodriguez | G01S 17/89 |
| | | | 701/16 |
| 8,744,126 B1* | 6/2014 | Rohrschneider | G06K 9/0063 |
| | | | 382/100 |
| 9,141,113 B1* | 9/2015 | Ivanov | G05D 1/0676 |
| 9,177,481 B2* | 11/2015 | Wang | B64C 19/00 |
| 9,446,851 B2* | 9/2016 | Abernathy | B64D 43/00 |
| 2010/0117867 A1* | 5/2010 | He | G01C 23/00 |
| | | | 340/974 |
| 2012/0029869 A1* | 2/2012 | Muensterer | G01S 7/411 |
| | | | 702/155 |
| 2012/0176497 A1* | 7/2012 | Shadmi | G01C 21/00 |
| | | | 348/144 |
| 2013/0179011 A1* | 7/2013 | Colby | G01C 21/20 |
| | | | 701/16 |
| 2013/0282208 A1 | 10/2013 | Mendez-Rodriguez | |
| 2014/0343765 A1* | 11/2014 | Suiter | G08G 5/0056 |
| | | | 701/18 |

OTHER PUBLICATIONS

Serrano, N. et al.; A Novel Tiered Sensor Fusion Approach for Terrain Characterization and Safe Landing Assessment; IEEEAC paper #1427, Version 3, Updated Nov. 23, 2005.

Shen, Y., et al.; An Automatic Computer-Aided Detection System for Aircraft Emergency Landing; AIAA 2011-1465; Mar. 29-31, 2011, St. Louis, Missouri.

EP Partial Search Report for Application No. 16198541.1-1803 dated May 17, 2017.

Extended EP Search Report for Application No. 16198541.1-1803 / 3188160 dated Sep. 7, 2017.

* cited by examiner

METHODS AND APPARATUS FOR IDENTIFYING TERRAIN SUITABLE FOR AIRCRAFT LANDING

TECHNICAL FIELD

Embodiments of the subject matter described herein relate generally to terrain analysis. More particularly, embodiments of the subject matter relate to terrain analysis onboard an aircraft for purposes of locating appropriate landing zones.

BACKGROUND

Problems or situations may arise during flight of an aircraft that necessitate an emergency landing. These situations may include mechanical problems with the aircraft itself, medical emergencies, law enforcement emergencies, or other unplanned circumstances occurring during flight. An aircraft will generally land at a designated location appropriate to the particular type of the aircraft. For example, a helicopter conducts a planned landing at a helipad. As another example, a commercial jet generally conducts a planned landing at an appropriate runway, which is usually located at an airport. However, during emergency landing situations, a runway or helipad appropriate for landing the aircraft may be unavailable and/or too far away to use.

Accordingly, it is desirable to accommodate emergency landing situations in which an appropriate landing area is unavailable. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing landing assistance for an aircraft. The method analyzes terrain data; identifies one or more landing zones, based on analyzing the terrain data, each of the one or more landing zones comprising a flat area lacking obstacles to aircraft landing; and presents the one or more landing zones via a display element onboard the aircraft.

Some embodiments of the present disclosure provide a system for providing landing assistance to an aircraft. The system includes: a system memory element, configured to store a terrain database comprising terrain data; at least one processor communicatively coupled to the system memory element, wherein the at least one processor is configured to: analyze the terrain data to identify terrain locations suitable for landing the aircraft, wherein the terrain locations are associated with a current location of the aircraft; and compile data associated with the terrain locations, wherein the data is suitable for use onboard the aircraft.

Some embodiments of the present disclosure provide a non-transitory, computer-readable medium containing instructions thereon, which, when executed by a processor, perform a method. The method identifies terrain areas within a threshold proximity of an aircraft during flight; determines whether the terrain areas are suitable for landing; and when one or more of the terrain areas are suitable for landing, presenting the one or more of the terrain areas via display element onboard the aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure presents methods and apparatus for identifying areas of terrain appropriate for landing an aircraft (i.e., a potential landing zone), and thus to assist a flight crew in identifying the nearest flat surfaces below a flight path that are suitable as a "landing zone". Identification of these landing zones may be useful during, for example, unplanned or emergency landing situations in which a pilot may need to put the aircraft down safely in a non-airport location. In certain embodiments, identifying potential landing zones may be performed at a ground location. However, in other embodiments, identifying potential landing zones may be performed onboard the aircraft. In some embodiments, a terrain database which includes digital elevation models (DEMs) or other terrain data may be analyzed to identify landing zones. Analysis of terrain data may include calculations of slope, land features, aspect, size of potential landing zones, or the like, to identify terrain areas which lack obstacles, and with a small enough slope to allow an aircraft to land safely.

Certain terminologies are used with regard to the various embodiments of the present disclosure. A landing zone may include any land area appropriate for landing an aircraft, as determined through terrain data analysis. Terrain data may include land slope, land features and obstacles, orientation of a land area, or the like. Terrain data may be stored in a terrain database at a ground location and/or onboard an aircraft.

Figure 1:
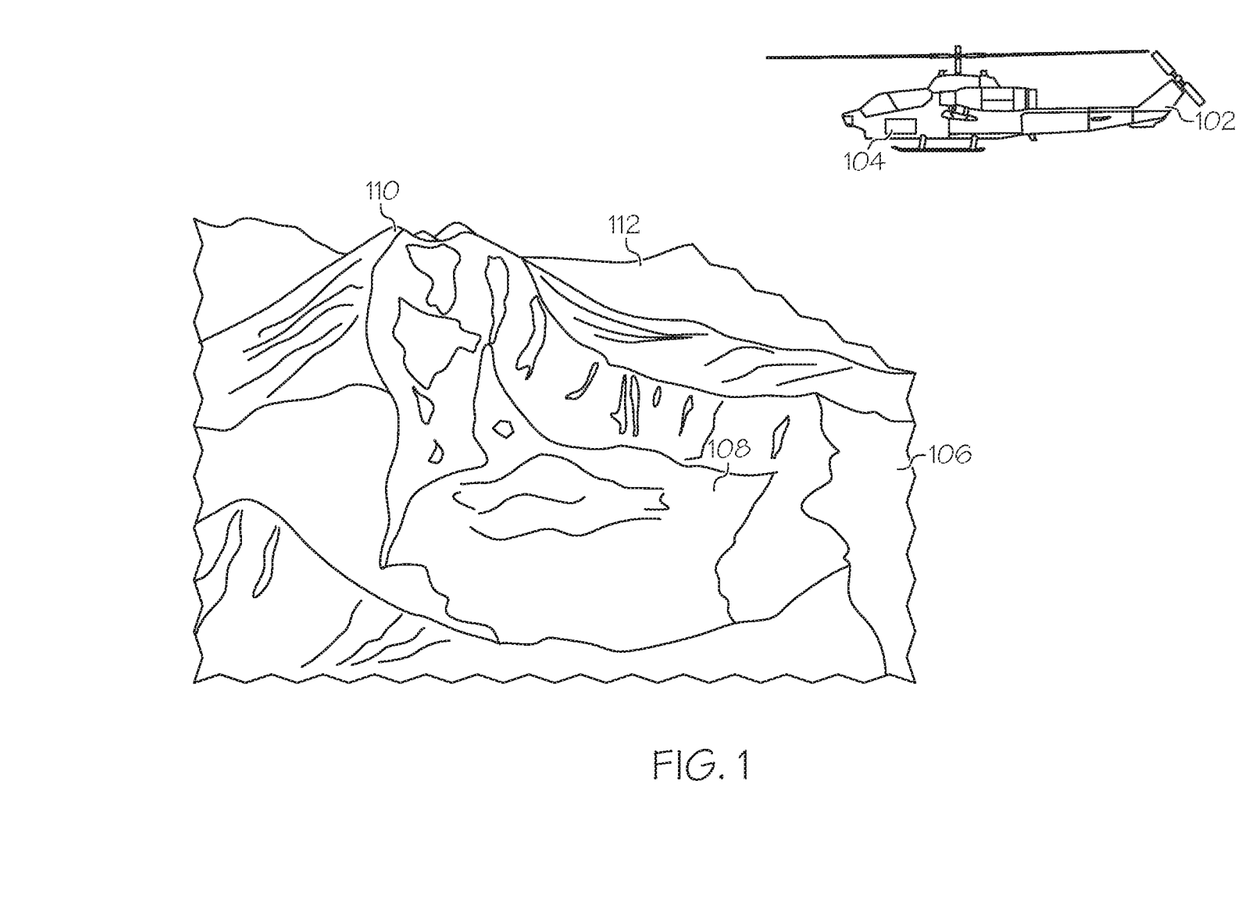
FIG. 1 is a diagram of an aircraft in flight over terrain, in accordance with the disclosed embodiments.

Turning now to the figures, FIG. 1 is a diagram of an aircraft 102 in flight over terrain 106, in accordance with the disclosed embodiments. The aircraft 102 may be any aviation vehicle that includes, or receives landing zone data from, a landing system 104, as described below, which obtains the requisite terrain data for performing analysis to determine appropriate landing zones. The aircraft 102 may be implemented as an airplane, helicopter, spacecraft, hovercraft, or the like.

The landing system 104 generally includes components which provide terrain data and navigation data to the aircraft 102 as needed for landing outside of a traditional landing zone. In other words, the landing system 104 provides information to the aircraft 102 so that the aircraft may land in an area other than a runway, a helipad, an airport, or other generally-accepted aircraft landing area. The landing system 104 is most useful for unplanned and/or emergency landing situations, in which the aircraft 102 may need to land in an unfamiliar geographic location including areas which may or may not be suitable for aircraft landing purposes. In certain embodiments, the landing system 104 is implemented using one or more avionics and/or avionics software platforms located onboard the aircraft 102. However, in other embodiments, the landing system 104 may be implemented using a handheld computing device, such as a smartphone, tablet computer, smartwatch, personal digital assistant, or the like. Both implementations (i.e., onboard systems of the aircraft 102 and a handheld computing device) are used onboard the aircraft 102 during flight.

The aircraft 102 uses a landing system 104 to recognize the different levels of terrain, and to locate an appropriate place to land amongst all of the available terrain/locations around the aircraft 102 at its current location. In the example shown, the terrain 106 includes water 108, elevated terrain 110, and flat terrain 112. In situations where the aircraft 102 may need to land, the aircraft 102 uses the landing system 104 to analyze the terrain 106, to identify and rule out the areas of water 108 and elevated terrain 110 as unsuitable for landing, to identify the areas of flat terrain 112 as suitable for landing, and to present the areas of flat terrain 112 to the flight crew. An area of flat terrain suitable for landing an aircraft may also be referred to as a potential landing zone.

Figure 2:
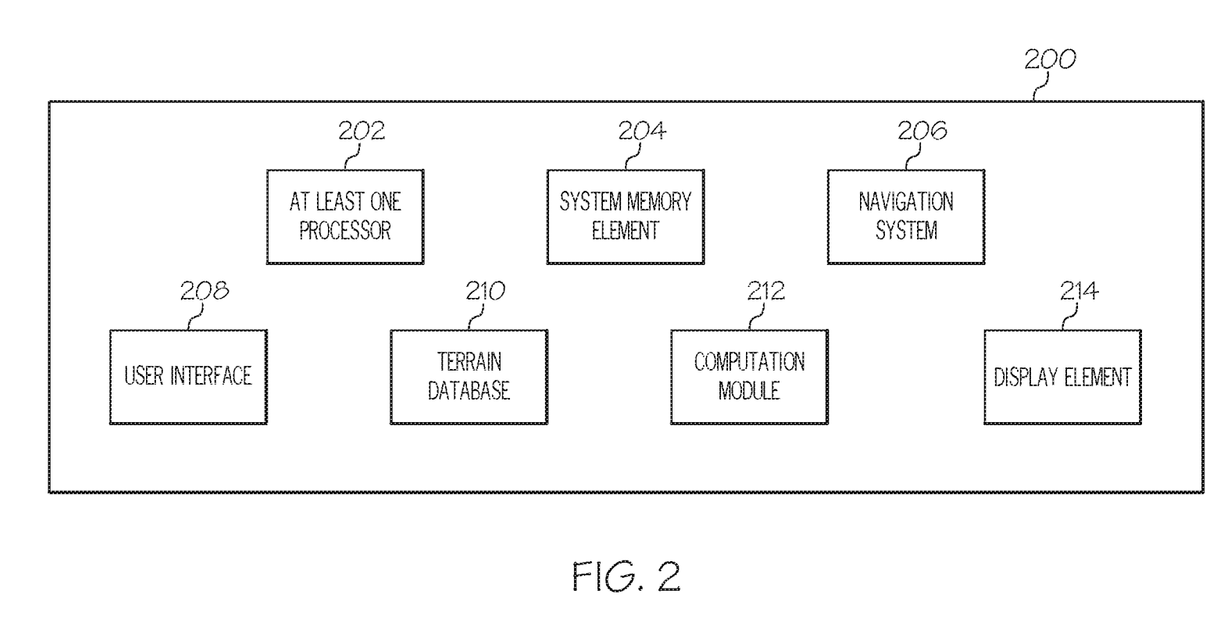
FIG. 2 is a functional block diagram of a landing system, in accordance with the disclosed embodiments.

FIG. 2 is a functional block diagram of a landing system 200, in accordance with the disclosed embodiments. It should be noted that the landing system 200 can be implemented with the component 104 depicted in FIG. 1. In this regard, the landing system 200 shows certain elements and components of the component 104 in more detail. However, it should also be appreciated that the landing system 200 may be implemented using a combination of devices, hardware, and/or software onboard the aircraft and devices, hardware, and/or software on the ground (e.g., at a tower, a computation center, an air traffic control center, or the like). Thus, functionality of the landing system 200 may be performed on the ground, on the aircraft, or in exemplary embodiments, certain landing system 200 functions may be performed on the ground while other landing system 200 functions are performed onboard the aircraft.

The landing system 200 generally includes, without limitation: at least one processor 202; a system memory element 204; a navigation system 206; a user interface 208; a terrain database 210; a computation module 212; and a display element 214. These elements and features of the landing system 200 may be operatively associated with one another, coupled to one another, or otherwise configured to cooperate with one another as needed to support the desired functionality—in particular, providing information related to appropriate landing zones for the aircraft, as described herein. For ease of illustration and clarity, the various physical, electrical, and logical couplings and interconnections for these elements and features are not depicted in FIG. 2. Moreover, it should be appreciated that embodiments of the landing system 200 will include other elements, modules, and features that cooperate to support the desired functionality. For simplicity, FIG. 2 only depicts certain elements that relate to the landing zone identification techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The system memory element 204 may be realized using any number of devices, components, or modules, as appropriate to the embodiment. Moreover, the landing system 200 could include a system memory element 204 integrated therein and/or a system memory element 204 operatively coupled thereto, as appropriate to the particular embodiment. In practice, the system memory element 204 could be realized as RAM memory, flash memory, EPROM memory, EEPROM memory, registers, a hard disk, a removable disk, or any other form of storage medium known in the art. In certain embodiments, the system memory element 204 includes a hard disk, which may also be used to support functions of the landing system 200. The system memory element 204 can be coupled to the at least one processor 202 such that the at least one processor 202 can read information from, and write information to, the system memory element 204. In the alternative, the system memory element 204 may be integral to the at least one processor 202. As an example, the at least one processor 202 and the system memory element 204 may reside in a suitably designed application-specific integrated circuit (ASIC).

The navigation system 206 is suitably configured to obtain one or more navigational parameters associated with operation of the aircraft. The navigation system 206 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 206, as will be appreciated in the art. In an exemplary embodiment, the navigation system 206 is capable of obtaining and/or determining the instantaneous position of the aircraft, that is, the current location of the aircraft (e.g., the latitude and longitude) and the altitude or above ground level for the aircraft. In some embodiments, the navigation system 206 may also obtain and/or determine the heading of the aircraft (i.e., the direction the aircraft is traveling in relative to some reference).

The user interface 208 may include or cooperate with various features to allow a user to interact with the landing system 200 components onboard the aircraft. Accordingly, the user interface 208 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the landing system 200. For example, the user interface 208 could be manipulated by an operator to set a desired swath, or in other words, a desired distance value for which a user wishes to receive continuous traveling conditions updates during traveling, as described herein.

In certain embodiments, the user interface 208 may include or cooperate with various features to allow a user to interact with the landing system 200 via graphical elements rendered on a display element 214. Accordingly, the user interface 208 may initiate the creation, maintenance, and presentation of a graphical user interface (GUI). In certain embodiments, the display element 214 implements touch-sensitive technology for purposes of interacting with the GUI. Thus, a user can manipulate the GUI by moving a cursor symbol rendered on the display element 214, or by physically interacting with the display element 214 itself for recognition and interpretation, via the user interface 208.

The terrain database 210 is generally stored at a ground location, where analysis of terrain data is performed. However, in some embodiments, the terrain database 210 may be stored onboard the aircraft. The terrain database 210 may be implemented using a worldwide digital terrain database, such as that stored in, and/or used for, existing avionics or avionics software platforms onboard the aircraft and/or handheld computing devices which may be used onboard the aircraft during flight. Such avionics, avionics software platforms, and handheld computing devices may include, without limitation: a terrain awareness and warning system (TAWS), an enhanced ground proximity warning system (EGPWS), a synthetic vision system (SVS), an electronic flight bag (EFB), an AV8OR system, or the like. In certain embodiments, the terrain database 210 includes at least one terrain map, digital elevation model (DEM), digital terrain model (DTM), digital surface model (DSM), or other terrain data compatible with landing system 200 analysis.

The computation module 212 is suitably configured to access the terrain data stored by the terrain database 210 and to analyze the terrain data to identify areas suitable for landing the aircraft. The computation module 212 generally evaluates terrain data representative of geographic areas within a threshold distance of a current location of the aircraft to recognize flat surfaces (i.e., surfaces with low slope values) which lack obstacles or other land features which may block an aircraft from landing on that particular flat surface. In certain embodiments, the computation module 212 evaluates digital terrain models stored in the terrain database to identify these flat surfaces appropriate for landing. In practice, the computation module 212 may be implemented with (or cooperate with) the at least one processor 202 to perform at least some of the functions and operations described in more detail herein. In this regard, the computation module 212 may be realized as suitably written processing logic, application program code, or the like.

As described above with regard to the terrain database 210, the computation module 212 may be located at a ground location or onboard the aircraft. In a first embodiment, the computation module 212 and the terrain database 210 are located at a ground location, and functionality associated with the computation module 212 and the terrain database 210 are performed at the ground location to produce output that is communicated to the aircraft for further use. In a second embodiment, the computation module 212 and the terrain database 210 are located onboard the aircraft, and functionality associated with the computation module 212 and the terrain database 210 are performed onboard the aircraft.

The display element 214 is configured to present graphics, instructions, and/or other data directing a flight crew to a landing zone (i.e., an area of terrain suitable for landing the aircraft). The display element 214 may be realized as an electronic display configured to graphically display flight information or other data associated with landing the aircraft. In an exemplary embodiment, the display element 214 is located within a cockpit or flight deck of the aircraft. It will be appreciated that although certain embodiments of the landing system 200 use a single display element 214, in other embodiments, additional display elements 214 may be present onboard the aircraft. In some embodiments, the display element 214 and/or user interface 208 may be located outside the aircraft (e. g., on the ground as part of an air traffic control center or another command center) and communicatively coupled to the remaining elements of the landing system 200 (e.g., via a data link).

Figure 3:
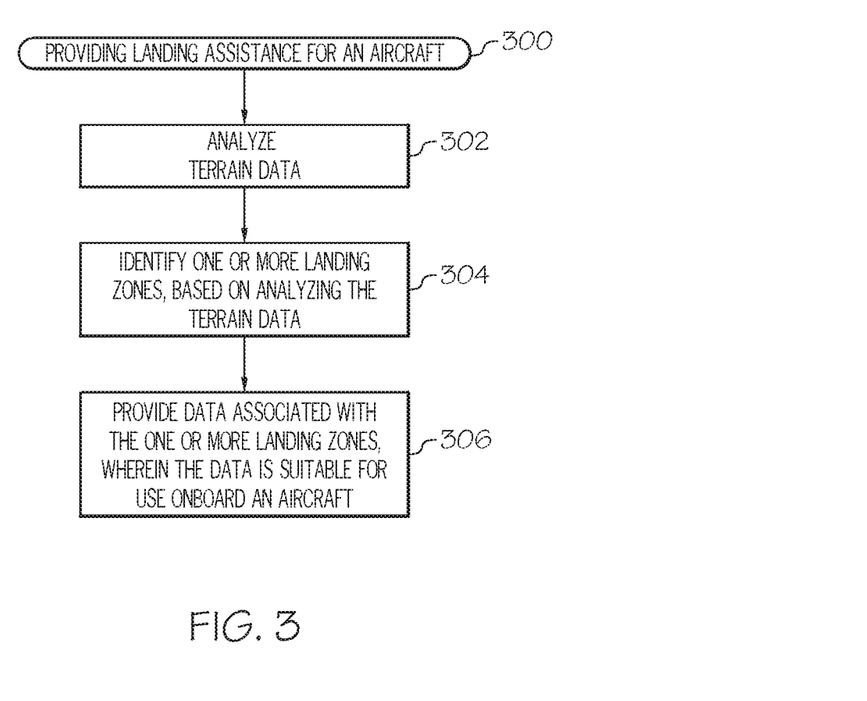
FIG. 3 is a flow chart that illustrates an embodiment of a process for providing landing assistance for an aircraft.

FIG. 3 is a flow chart that illustrates an embodiment of a process 300 for providing landing assistance for an aircraft. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

For ease of description and clarity, this example assumes the process 300 begins by analyzing terrain data (step 302). One suitable methodology for analyzing terrain data is described below with reference to FIG. 4. Terrain data may be associated with any geographic region of the earth. Terrain data may include any data associated with elevation, slope, obstacles, locations of bodies of water, or other terrain features which may be beneficial for, or hinder, the landing of an aircraft in a particular geographic region. Obstacles may include any land feature that may block the aircraft from landing in a particular terrain area, such as trees, boulders, or other land features. Land features may be naturally-occurring or man-made. Terrain areas most suited to aircraft landing include low slope values, and generally, the process 300 uses a predefined slope threshold to determine whether an area of terrain may be used for landing an aircraft.

Next, the process 300 identifies one or more landing zones, based on the analysis of the terrain data (step 304). Here, the process 300 has evaluated the terrain, and identifies areas suitable for aircraft landing. For example, the process 300 may determine that an area of elevated terrain may be unsuitable for landing, due to the presence of obstacles and a greater than permissible slope value. Some embodiments identify high slope values by comparing the slope to a predefined threshold. For example, a potential landing zone for an aircraft may be defined as an area of terrain with slope values below three degrees. In this scenario, any area of terrain with slope values above three degrees is deemed unsuitable for aircraft landing. As another example, the process 300 may determine that an area of flat terrain may be suitable for landing, due to the slope values below a predefined threshold (i.e., low slope) and a lack of obstacles.

The process 300 then provides data associated with the one or more landing zones, wherein the data is suitable for use onboard an aircraft (step 306). In exemplary embodiments, the landing zone data may be provided in the form of metadata via text file or other file type which may be uploaded to one or more systems onboard the aircraft. In some embodiments, the landing zone data may be included in an electronic flight bag or as an addendum to a terrain awareness and warning (TAWS) onboard the aircraft.

Figure 4:
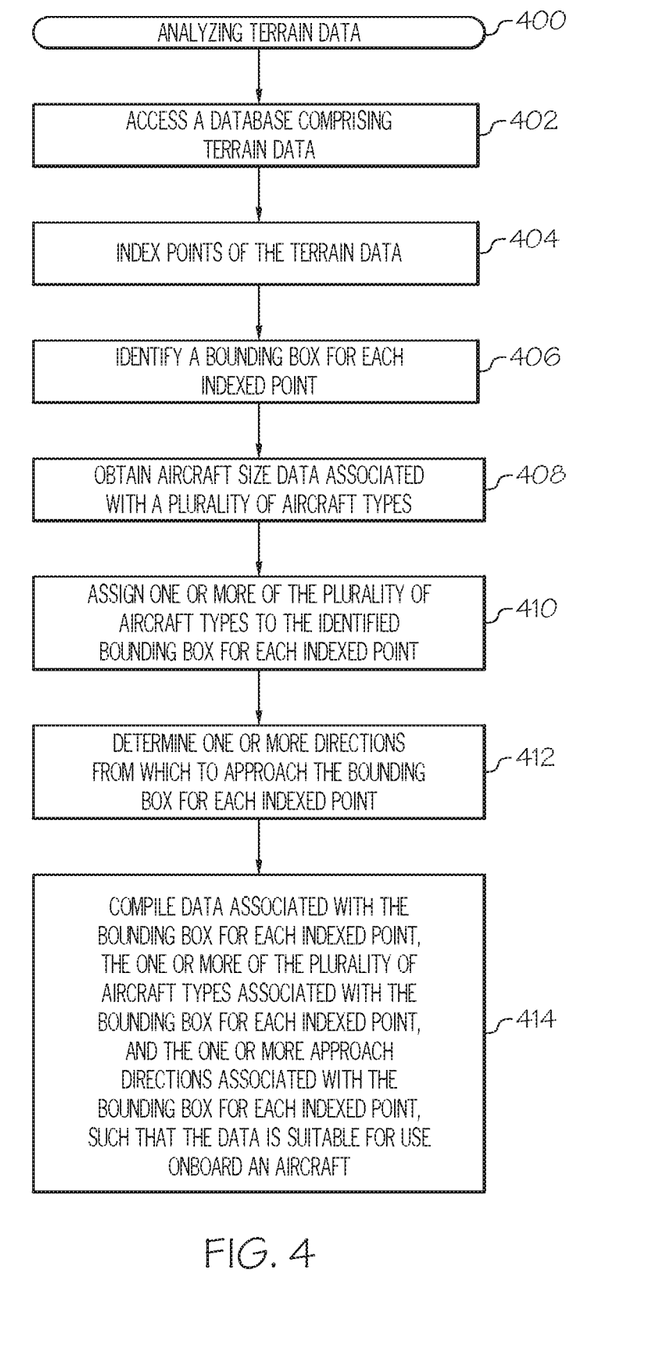
FIG. 4 is a flow chart that illustrates an embodiment of a process for analyzing terrain data associated with a current location of an aircraft.

FIG. 4 is a flow chart that illustrates an embodiment of a process 400 for analyzing terrain data. It should be appreciated that the process 400 described in FIG. 4 represents one embodiment of step 302 described above in the discussion of FIG. 3, including additional detail. First, the process 400 accesses a database comprising terrain data (step 402). The terrain data may include at least one digital elevation model (DEM), digital terrain model (DTM), digital surface model (DSM), or other terrain data compatible with further analysis as described herein. In some embodiments, terrain data may be accessed and analyzed at a location external to an aircraft (e.g., at a tower, a computation center, an air traffic control center, or the like). In other embodiments, however, the database is located onboard the aircraft and the terrain data is preloaded and available for further analysis by one or more systems onboard the aircraft.

Next, the process 400 indexes points of the terrain data (step 404). One suitable methodology for indexing points of a subset of terrain data associated with a current location of the aircraft is described below with reference to FIG. 5. Points are selected to be "indexed" when criteria associated with each point is deemed suitable for aircraft landing purposes. Thus, the term "indexed point" indicates that the point is in a favorable location for landing an aircraft (i.e., nearly flat terrain with a low slope value, no obstacles (e.g., trees or other protruding land features), favorable aspect). Points that are not indexed do not satisfy the criteria required for aircraft landing suitability. Point criteria may include, without limitation: slope, land features and obstacles, aspect, size of potential landing zones, or the like.

The process 400 then identifies a bounding box for each indexed point (step 406). Because an indexed point does not include an area large enough for an aircraft to land (i.e., a potential landing zone), the process 400 evaluates one or more areas around the indexed point that are large enough for one or more aircraft types to land. Here, although a small area or "point" meeting the physical criteria of a landing zone may be identified (i.e., indexed points), the process 400 evaluates each terrain area to determine whether the area surrounding an indexed point is also suitable for use as a landing zone. This area surrounding the indexed point is referred to as a "bounding box", and is identified using a center point that is the indexed point, and bounding box coordinates indicating the boundaries of the area that meets the physical criteria of a landing zone. A bounding box may also be referred to as a landing zone or terrain area suitable for aircraft landing.

Particular embodiments of the process 400 access the terrain database comprising digital elevation models (DEMs), and perform a first scan of the DEMs to determine landing suitability for location points identified by each of the DEMs (as described above with regard to FIG. 4). Each suitable point is assigned an index, to create an indexed point. Additionally, the process 400 may perform a second scan of the DEMs to identify one or more groups or "clusters" of the indexed points, for purposes of creating the bounding boxes around the identified clusters.

The process 400 obtains aircraft size data associated with a plurality of aircraft types (step 408). The process 400 may have access to a database or other form of data storage which includes a list or registry of various aircraft types and associated sizes.

After obtaining aircraft size data associated with a plurality of aircraft types (step 408), the process 400 assigns one or more of the plurality of aircraft types to the identified bounding box for each indexed point (step 410). The type and size of the aircraft are directly applicable to the size and/or shape (e.g., length, width) of the landing zone required for that particular aircraft. Here, the process 400 identifies aircraft types that are small enough to land in a particular bounding box, and assigns the aircraft types which may use a particular bounding box as a landing zone to that bounding box.

The process 400 also determines one or more directions from which to approach the bounding box for each indexed point (step 412). Based on obstacles and land features present in a particular bounding box, an aircraft may be limited to approach and landing in a particular bounding box from one or more particular directions and/or angles.

The process 400 then compiles data associated with: (1) the bounding box for each indexed point, (2) the one or more of the plurality of aircraft types associated with the bounding box for each indexed point, and (3) the one or more approach directions associated with the bounding box for each indexed point, such that the data is suitable for use onboard the aircraft (step 414).

In certain embodiments, the process 400 compiles the data into a text file or other data file which may be uploaded into an aircraft for use onboard. In other embodiments, the process 400 may communicate the data to the aircraft in other ways (e.g., via data communication network or other communication method).

Figure 5:
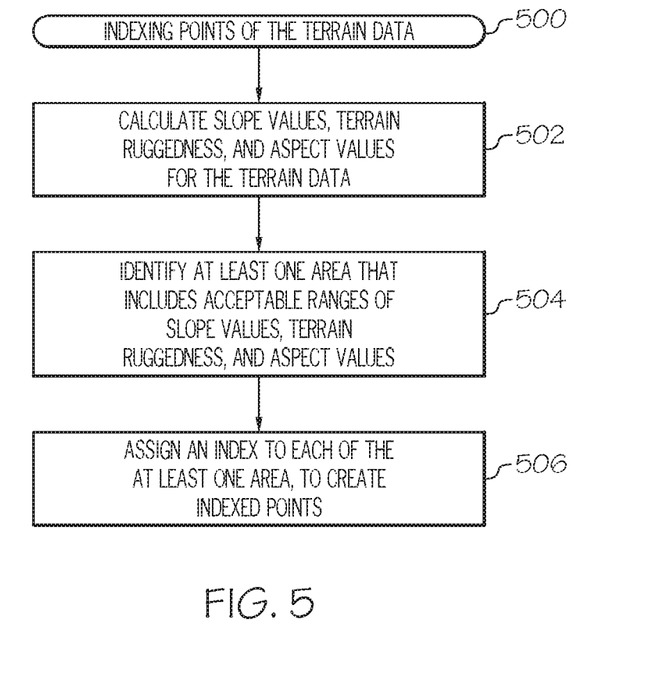
FIG. 5 is a flow chart that illustrates an embodiment of a process for indexing points of a subset of terrain data associated with a current location of an aircraft.

FIG. 5 is a flow chart that illustrates an embodiment of a process 500 for indexing points of a subset of terrain data associated with a current location of an aircraft. It should be appreciated that the process 500 described in FIG. 5 represents one embodiment of step 404 described above in the discussion of FIG. 4, including additional detail. First, the process 500 calculates slope values, terrain ruggedness, and aspect values for the terrain data (step 502). The aspect may be defined as the compass direction that the slope faces or, in other words, the aspect is the orientation of the slope. Flat surfaces have an aspect value of zero.

Slope is defined as the change is elevation (a rise) with a change in horizontal position (a run). In certain embodiments, slope is calculated by comparing the pixel value at a particular location relative to the surrounding pixel values, which provides a steepness of the slope. Exemplary embodiments of the present disclosure iterate through 3×3 cell windows for an entire digital elevation model (DEM), and the slope is calculated by obtaining the elevation change in X and Y directions. Low slope values indicate flat terrain, and slope values below a predefined threshold indicate terrain that is sufficiently flat as to enable aircraft landing. Certain embodiments of the present disclosure may define terrain suitable for aircraft landing as terrain that includes a slope of less than two degrees. Other embodiments may define terrain suitable for aircraft landing as terrain that includes a slope of less than five degrees. It should be appreciated that slope values appropriate for aircraft landing may vary, based on the particular aircraft involved.

A terrain ruggedness value provides a rapid, objective measure of terrain heterogeneity. In exemplary embodiments, the terrain ruggedness value is used to express the amount of elevation difference between adjacent cells of a DEM, and corresponds to average elevation change between any point on a grid and its surrounding area. The terrain ruggedness value is calculated for every location, by summarizing changes in elevation within a 3×3 pixel grid. Terrain ruggedness values are grouped into categories to describe the different types of terrain: "flat" surfaces, "nearly flat" surfaces, and "rugged" surfaces.

It should be appreciated that a 3×3 cell window or grid window may be used to perform analysis of the terrain data to determine particular terrain parameters (e.g., slope, aspect, terrain ruggedness), as described above. However, other embodiments may utilize larger or smaller grid or cell windows to perform calculations and analysis of the terrain data from digital models (e.g., DEMs).

Next, the process 500 identifies at least one area that includes acceptable ranges of the slope values, the terrain ruggedness, and the aspect values (step 504). Based on the above-described terrain parameters, a flatness index is assigned to each identified flat surface. The ease of approaching each flat surface is estimated using the surrounding terrain information and an approachability index is assigned to the same. Here, the process 500 determines that the at least one area is flat enough for aircraft landing, without obstacles or impediments to landing, and which includes a favorable aspect. The process 500 then assigns an index to each of the at least one area, to create indexed points (step 506). This index may be referred to as a "suitability index". Based on both the above flatness and approachability indices, the suitability index is assigned to the flat surfaces identified as suitable for aircraft landing by the above-described analysis.

In certain embodiments, the suitability index and bounding box coordinate information (as described above with respect to FIG. 4) associated with each identified flat surface are included in a text file and/or metadata file for use by an aircraft software platform, such as a terrain awareness and warning system (TAWS), an enhanced ground proximity warning system (EGPWS), electronic flight bag, an AV8OR platform, or the like. In some embodiments, the process 500 may create a text file and/or metadata file appropriate for use by a handheld computing device. In these examples, the text file and/or metadata file may be used during flight to provide display information regarding available flat surfaces for landing the aircraft.

Figure 6:
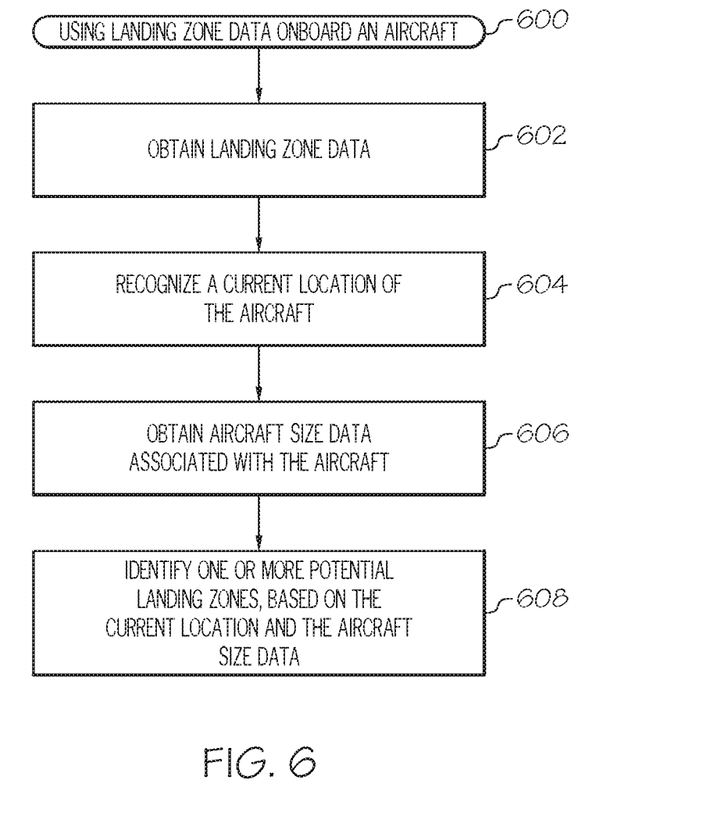
FIG. 6 is a flow chart that illustrates an embodiment of a process for using landing zone data onboard an aircraft.

FIG. 6 is a flow chart that illustrates an embodiment of a process for using landing zone data onboard an aircraft. First, the process 600 obtains landing zone data (step 602). In some embodiments, the landing zone data is obtained as a text file or other data file uploaded into one or more systems onboard the aircraft for use. In other embodiments, the landing zone data may be accessed at a remote server by a communication system onboard the aircraft via a data communication network.

Next, the process 600 recognizes a current location of the aircraft (step 604). The process 600 may communicate with an onboard navigation system or other onboard system to obtain current location information. The process 600 also obtains aircraft size data associated with the aircraft (step 606). Aircraft size data may be stored onboard the aircraft or communicated to the aircraft from an external storage location. In certain embodiments, aircraft size data may be associated with an aircraft type, and interpreted by accessing the aircraft type.

The process 600 then identifies one or more potential landing zones, based on the current location and the aircraft size data (step 608). Here, the current location of the aircraft indicates potential landing zones within an appropriate range of the aircraft, and the size of the aircraft is directly applicable to the size of the landing zone required for that particular aircraft. Generally, terrain data has been previously evaluated to identify landing zones that satisfy particular physical criteria required for aircraft landing (see FIGS. 3-5), and this pre-computed landing zone data is provided to the aircraft. The process 600 identifies landing zones that are potentially usable for the aircraft by identifying landing zones that are: (1) large enough for the aircraft to land (identified by aircraft size data and/or aircraft type data), and (2) located close enough to the current location of the aircraft for use.

In certain embodiments, the process 600 uses the aircraft location, aircraft type, and performance combined with the pre-computed flat surface text file to identify the nearest approachable flat area within a threshold. In exemplary embodiments, identification of the flat areas suitable for landing is performed at a location external to the aircraft, and supplied to the aircraft via uploadable data file. Based on the current location of the aircraft, the nearest flat surface is identified by the process 600 using the textual data that contains the bounding boxes of the flat areas and related metadata.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing landing assistance for an aircraft, the method comprising:
 accessing a terrain database comprising terrain data;
 analyzing the terrain data, by at least one processor onboard the aircraft, by:
  accessing a terrain database comprising digital elevation models (DEMs);
  evaluating the DEMs, by:
   indexing points of the DEMs to obtain indexed points appropriate for landing the aircraft, by:
    calculating slope values, terrain ruggedness, and aspect values for the terrain data associated with the current location of the aircraft;
    identifying at least one area that includes acceptable ranges of slope values, terrain ruggedness, and aspect values, wherein the acceptable ranges comprise the slope values below a predefined threshold, the terrain ruggedness describing changes in elevation within a defined pixel grid, the changes below a second threshold indicating flat or nearly flat surfaces, and the aspect values of zero; and
    assigning an index to each of the at least one area, to create the indexed points;
    wherein the flat areas lacking obstacles to aircraft landing comprise the at least one area;
   obtaining aircraft size data associated with the aircraft; and
   identifying one or more bounding boxes using the aircraft size data, each of the one or more bounding boxes associated with a respective one of the indexed points of the DEMs;
   wherein the flat areas lacking obstacles to aircraft landing comprise the one or more bounding boxes; and
  identifying the one or more landing zones, based on evaluating the DEMs;
 recognizing a current location of the aircraft, by a navigation system communicatively coupled to the at least one processor onboard the aircraft;
 obtaining aircraft size data, by the at least one processor, wherein the aircraft size data is stored in a system memory element communicatively coupled to the at least one processor;
 identifying one or more landing zones, based on analyzing the terrain data, the current location, and the aircraft size data, by the at least one processor, each of the one or more landing zones comprising flat areas lacking obstacles to aircraft landing;
 presenting the one or more landing zones via a display element communicatively coupled to the at least one processor onboard the aircraft.

2. The method of claim 1, wherein analyzing the terrain data further comprises:
 identifying potential landing zones comprising slope values below a predefined threshold; and
 recognizing terrain features associated with each of the potential landing zones, wherein the terrain features comprise at least one of slope values, obstacles, and locations of bodies of water; and
 wherein identifying the one or more landing zones further comprises determining the flat areas lacking obstacles to the aircraft landing, based on the terrain features.

3. The method of claim 1, further comprising:
 identifying coordinates for each of the one or more bounding boxes;
 incorporating the coordinates into an uploadable metadata file configured for use by an aircraft software platform onboard the aircraft; and using the uploadable metadata file to provide display information for the one or more landing zones.

4. The method of claim 1, wherein analyzing the terrain data further comprises:
accessing a terrain database comprising digital elevation models (DEMs);
performing a first scan of each of the DEMs to determine landing suitability for location points identified by each of the DEMs;
assigning an index to each of the location points that is determined suitable for landing, to create indexed points, wherein the landing suitability is determined by slope values below a predefined threshold for location points and absence of obstacles for location points; and
performing a second scan of the DEMs to identify one or more clusters of the indexed points, wherein each of the one or more clusters comprises a group of indexed points;
wherein the flat areas lacking obstacles to aircraft landing comprise the one or more clusters.

5. The method of claim 4, further comprising:
creating bounding boxes around each of the one or more clusters, wherein each of the bounding boxes comprises bounding box coordinates indicating boundaries of an area that meets physical criteria of the one or more landing zones, and wherein each of the bounding boxes includes a center point comprising one of the group of indexed points;
determining a required landing patch size, based on a size of the aircraft;
comparing each of the bounding boxes to the required landing patch size; and
identifying a subset of the bounding boxes greater than or equal to the required landing patch size;
wherein the flat areas lacking obstacles to aircraft landing comprise the subset.

6. A system for providing landing assistance to an aircraft, the system comprising:
a system memory element, configured to store aircraft size data associated with the aircraft and a terrain database comprising terrain data;
a navigation system configured to provide location data onboard the aircraft;
a display device configured to present terrain location data onboard the aircraft;
at least one processor communicatively coupled to the system memory element, the navigation system, and the display device, wherein the at least one processor is configured to:
recognize a current location of the aircraft, via the navigation system;
obtain the aircraft size data, via the system memory element;
analyze the terrain data of the terrain database to identify terrain locations suitable for landing the aircraft, due to the terrain locations comprising flat areas lacking obstacles to aircraft landing and wherein the terrain locations are associated with the current location of the aircraft and the aircraft size data, by:
calculating slope values, terrain ruggedness, and aspect values for the terrain data; and
identifying at least one area that includes acceptable ranges of slope values, terrain ruggedness, and aspect values, wherein the acceptable ranges comprise the slope values below a predefined threshold, the terrain ruggedness describing changes in elevation within a defined pixel grid, the changes below a second threshold indicating flat or nearly flat surfaces, and the aspect values of zero;
wherein the terrain locations suitable for landing the aircraft comprise the at least one area;
compile data associated with the terrain locations, wherein the data is suitable for use onboard the aircraft; and
present the data associated with the terrain locations, via the display device.

7. The system of claim 6, wherein the at least one processor is further configured to:
access the terrain database comprising digital elevation models (DEMs), wherein the terrain data comprises the DEMs;
perform a first scan of each of the DEMs to determine landing suitability for location points identified by each of the DEMs;
assign an index to each of the location points that is determined suitable for landing, to create indexed points; and
perform a second scan of the DEMs to identify clusters of the indexed points;
wherein the terrain locations comprise the clusters.

8. The system of claim 7, wherein the at least one processor is further configured to:
determine a required landing patch size, based on a size of the aircraft;
compare each of the clusters of indexed points to the required landing patch size; and
identify a subset of the clusters greater than or equal to the required landing patch size;
wherein the flat areas lacking obstacles to aircraft landing comprise the subset.

9. The system of claim 6, wherein the at least one processor is further configured to:
access the terrain database comprising digital elevation models (DEMs);
evaluate the DEMs; and
identify the terrain locations, based on evaluating the DEMs.

10. The system of claim 9, wherein the at least one processor is further configured to:
index points of the subset of the DEMs to obtain indexed points suitable for aircraft landing;
obtain aircraft size data associated with the aircraft; and
identify one or more bounding boxes using the aircraft size data, each of the one or more bounding boxes associated with a respective one of the indexed points of the DEMs;
wherein the flat areas lacking obstacles to aircraft landing comprise the one or more bounding boxes.

11. The system of claim 10, wherein the at least one processor is further configured to:
identify coordinates for each of the one or more bounding boxes;
incorporate the coordinates into an uploadable metadata file configured for use by an aircraft software platform onboard the aircraft; and
provide display information, based on the uploadable metadata file, for the one or more terrain locations.

12. A non-transitory, computer-readable medium containing instructions thereon, which, when executed by a processor, perform a method for providing landing assistance for an aircraft, the method comprising:
accessing a terrain database comprising terrain data;

recognizing a current location of the aircraft, by a navigation system communicatively coupled to the processor onboard the aircraft;

obtaining aircraft size data, by the processor, wherein the aircraft size data is stored in a system memory element communicatively coupled to the processor;

identifying, by the processor, terrain areas within a threshold proximity of an aircraft during flight based on the terrain data;

determining whether the terrain areas are suitable for landing due to the terrain areas comprising flat areas lacking obstacles to aircraft landing, based on the terrain data, the current location, and the aircraft size data, by:

calculating slope values, terrain ruggedness, and aspect values for terrain data; and identifying at least one area that includes acceptable ranges of slope values, terrain ruggedness, and aspect values, wherein the acceptable ranges comprise the slope values below a predefined threshold, the terrain ruggedness describing changes in elevation within a defined pixel grid, the changes below a second threshold indicating flat or nearly flat surfaces, and the aspect values of zero;

wherein the flat areas lacking obstacles to aircraft landing comprise the at least one area; and when one or more of the terrain areas are suitable for landing, presenting the one or more of the terrain areas via display element onboard the aircraft.

13. The non-transitory, computer-readable medium of claim 12, wherein the method further comprises:

accessing a terrain database comprising digital elevation models (DEMs);

evaluating the DEMs; and identifying the one or more of the terrain areas, based on evaluating the DEMs.

14. The non-transitory, computer-readable medium of claim 13, wherein the method further comprises:

indexing points of the DEMs to obtain indexed points associated with the terrain areas suitable for landing the aircraft;

obtaining aircraft size data associated with the aircraft; and identifying one or more bounding boxes using the aircraft size data, each of the one or more bounding boxes associated with a respective one of the indexed points of the DEMs;

wherein the flat areas lacking obstacles to aircraft landing comprise the one or more bounding boxes.

15. The non-transitory, computer-readable medium of claim 14, wherein the method further comprises:

identifying coordinates for each of the one or more bounding boxes;

incorporating the coordinates into an uploadable metadata file configured for use by an aircraft software platform onboard the aircraft; and using the uploadable metadata file to provide display information for the one or more terrain areas.

16. The non-transitory, computer-readable medium of claim 12, wherein the method further comprises:

accessing a terrain database comprising digital elevation models (DEMs);

performing a first scan of each of the DEMs to determine landing suitability for location points identified by each of the DEMs;

assigning an index to each of the location points that is determined suitable for landing, to create indexed points; and performing a second scan of the DEMs to identify one or more clusters of the indexed points;

wherein the one or more landing zones comprise the one or more clusters.

\* \* \* \* \*